Sept. 21, 1965 R. S. CASAVANT 3,208,075

ELECTRONIC WAVEFORM CHARACTER GENERATOR

Filed Dec. 23, 1963 10 Sheets-Sheet 1

INVENTOR.
ROBERT S. CASAVANT
BY George C. Sullivan
Agent

Sept. 21, 1965 R. S. CASAVANT 3,208,075

ELECTRONIC WAVEFORM CHARACTER GENERATOR

Filed Dec. 23, 1963 10 Sheets-Sheet 2

INVENTOR.
ROBERT S. CASAVANT
BY George C. Sullivan
Agent

ELECTRONIC WAVEFORM CHARACTER GENERATOR

INVENTOR.
ROBERT S. CASAVANT
BY George C. Sullivan
Agent

Sept. 21, 1965 R. S. CASAVANT 3,208,075

ELECTRONIC WAVEFORM CHARACTER GENERATOR

Filed Dec. 23, 1963 10 Sheets-Sheet 4

INVENTOR.
ROBERT S. CASAVANT
BY George C. Sullivan
Agent

Sept. 21, 1965 R. S. CASAVANT 3,208,075

ELECTRONIC WAVEFORM CHARACTER GENERATOR

Filed Dec. 23, 1963 10 Sheets-Sheet 5

INVENTOR.
ROBERT S. CASAVANT
BY
George C. Sullivan
Agent

Sept. 21, 1965 R. S. CASAVANT 3,208,075

ELECTRONIC WAVEFORM CHARACTER GENERATOR

Filed Dec. 23, 1963 10 Sheets-Sheet 6

INVENTOR.
ROBERT S. CASAVANT
BY
George C. Sullivan
Agent

ELECTRONIC WAVEFORM CHARACTER GENERATOR

Filed Dec. 23, 1963 10 Sheets-Sheet 7

INVENTOR.
ROBERT S. CASAVANT
BY
George C. Sullivan
Agent

ELECTRONIC WAVEFORM CHARACTER GENERATOR

INVENTOR.
ROBERT S. CASAVANT
BY
George C. Sullivan
Agent

INVENTOR.
ROBERT S. CASAVANT
BY George C. Sullivan
Agent

INVENTOR.
ROBERT S. CASAVANT
BY George Sullivan
Agent

United States Patent Office 3,208,075
Patented Sept. 21, 1965

3,208,075
ELECTRONIC WAVEFORM CHARACTER GENERATOR

Robert S. Casavant, Merritt Island, Fla., assignor to Lockheed Aircraft Corporation, Burbank, Calif.
Filed Dec. 23, 1963, Ser. No. 332,694
14 Claims. (Cl. 346—33)

Figure 1:
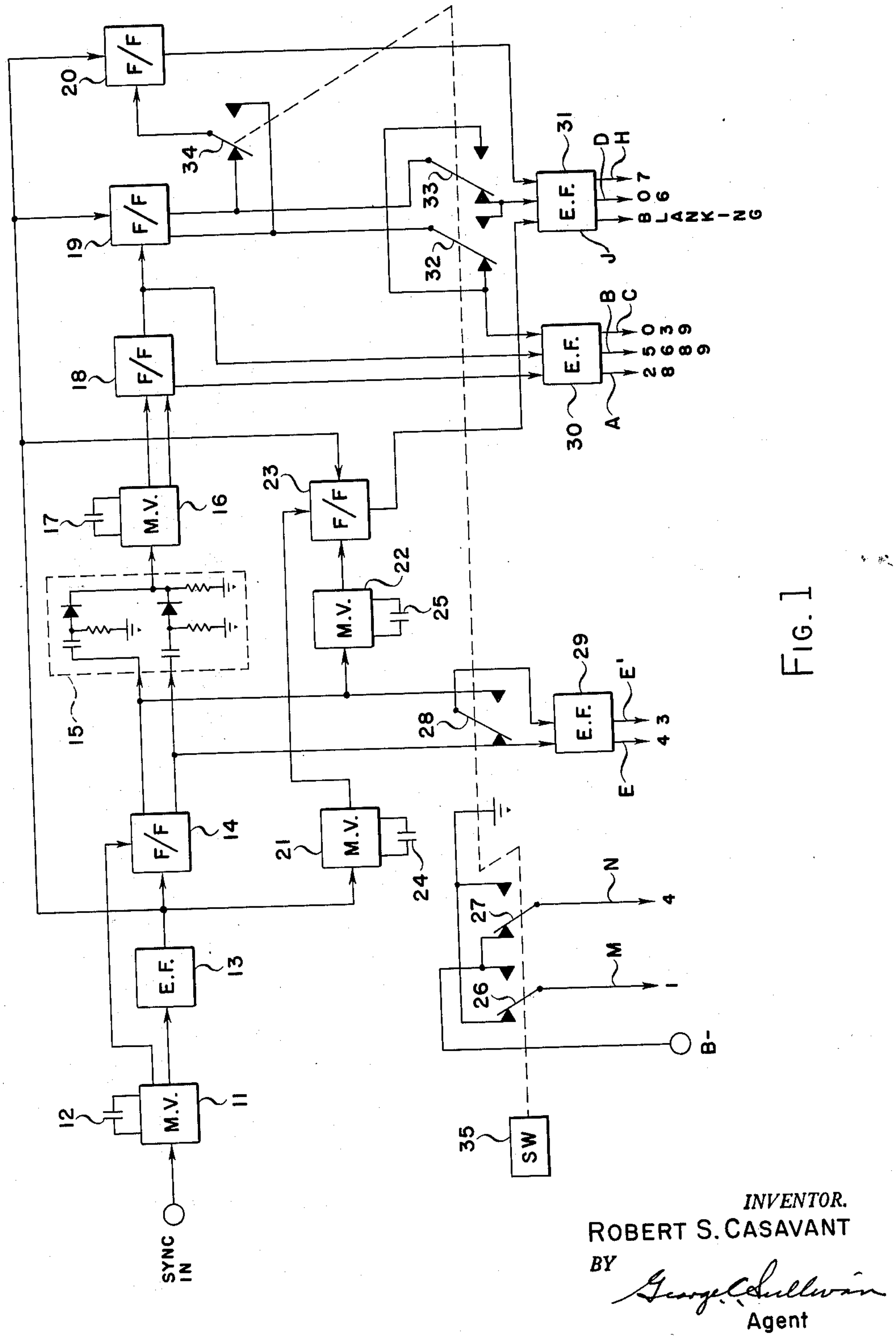

The present invention relates generally to electronic apparatus useful for displaying alpha-numeric or similar characters on a recording medium, and in particular to an electronic waveform generator.

Today a great amount of telemetry and other information is transmitted to data reduction centers which are designed to process large quantities of telemetry and other data. Many of the devices used in data reduction centers are extremely complex, expensive, and require skilled technicians to operate and maintain.

By using the present invention, an extremely rapid printout of conventional numbers, letters, or similar characters may be obtained on an oscillograph recorder by using a low inertia device such as a galvanometer. For example, one could print simultaneously with and adjacent to an analog wave train on an oscillograph recorder in digital or decimal form, the value of the analog wave train in percentages, volts, or engineering units. This diminishes the need for data analysts employing the cumbersome methods now used to reduce telemetry information, and will allow instant spot checks of the incoming signals in a manner heretofore very expensive and complex. Oscilloscope presentation is also possible if so desired by using a multi-trace oscilloscope.

A unique feature of the present invention which distinguishes it from other known electronic character generators is that the present device makes use of the linear motion inherent in beam deflection apparatus, such as the linear paper motion in an oscillograph or the linear sweep in an oscilloscope. Other known electronic character generators do not use this feature, but rather rely on deflection of a cathode ray beam along both the X-axis and the Y-axis, generating characters which are viewed directly on the face of the cathode ray tube or projected onto photo-sensitive paper for a permanent recording or any other beam-responsive medium.

The main object of the present invention is to provide improved means for generating electronic waveforms which, when properly combined and synchronized, will produce alpha-numeric symbols such as numbers and letters or similar characters such as mathematical and technical symbols on the beam-responsive medium of a beam-deflection apparatus such as an oscillograph recorder or an oscilloscope.

Another object of the invention is to provide a means of generating characters for visual observation or permanent recording at rates of speed potentially much higher than heretofore possible with any known type of beam-deflection apparatus, electronic or mechanical.

One feature of the present invention is in feeding synchronized waveforms to control one or more galvanometers, the outputs of which form a single alpha-numeric character on an oscillograph record.

Another feature of the present invention is in displacing the traces of a multi-trace oscilloscope with synchronized waveforms to produce alpha-numeric or similar characters.

Another feature of the present invention is in properly synchronizing the output waveforms to provide an alpha-numeric character simultaneously with an input signal from a character designating device.

Figure 2A:
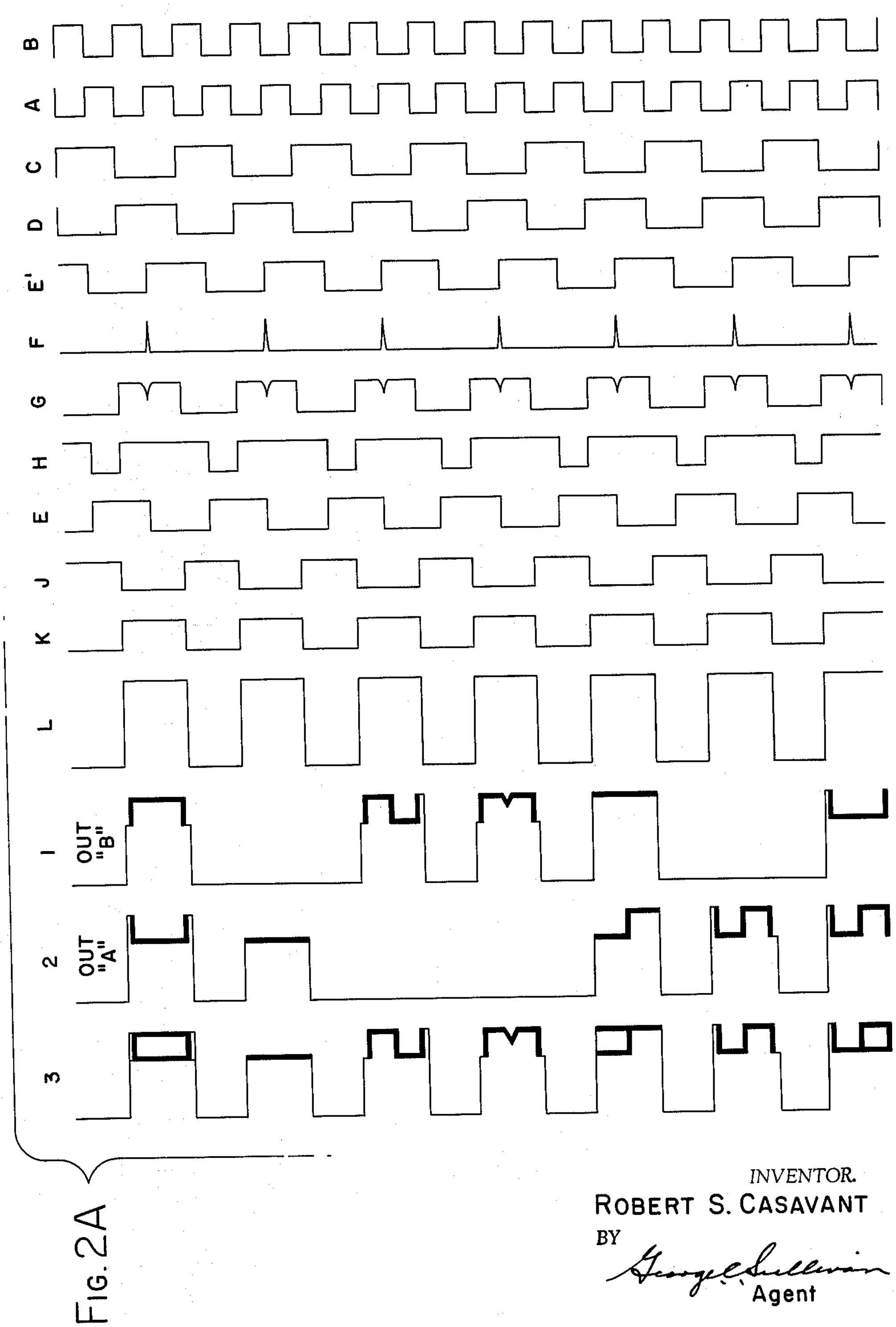
Figure 2B:
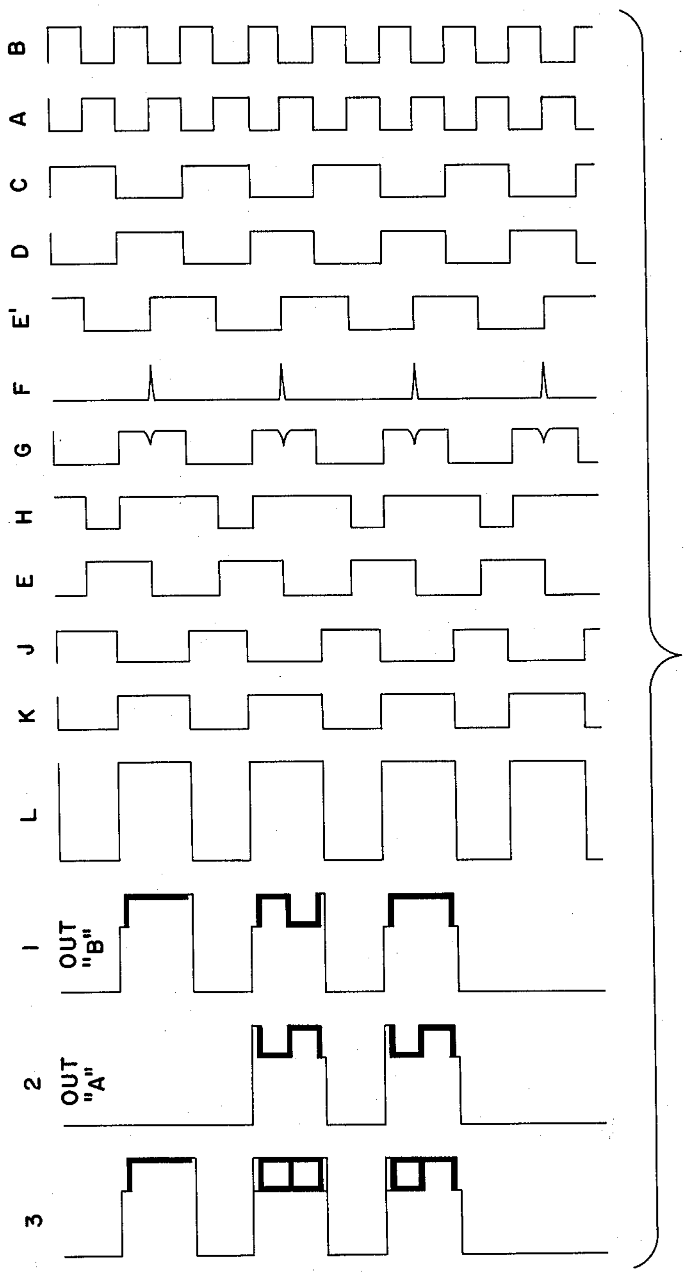
Figure 3A:
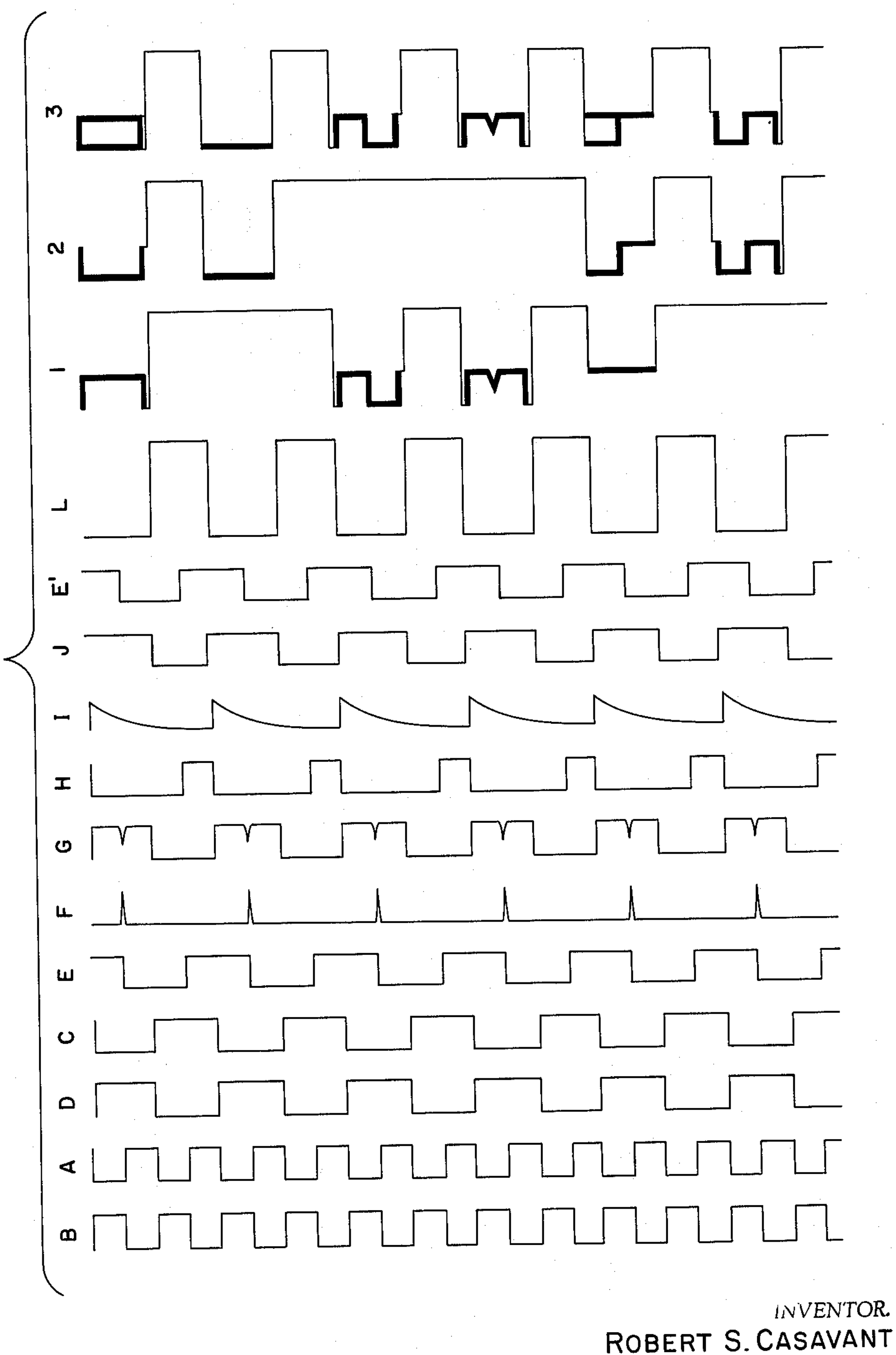
Figure 3B:
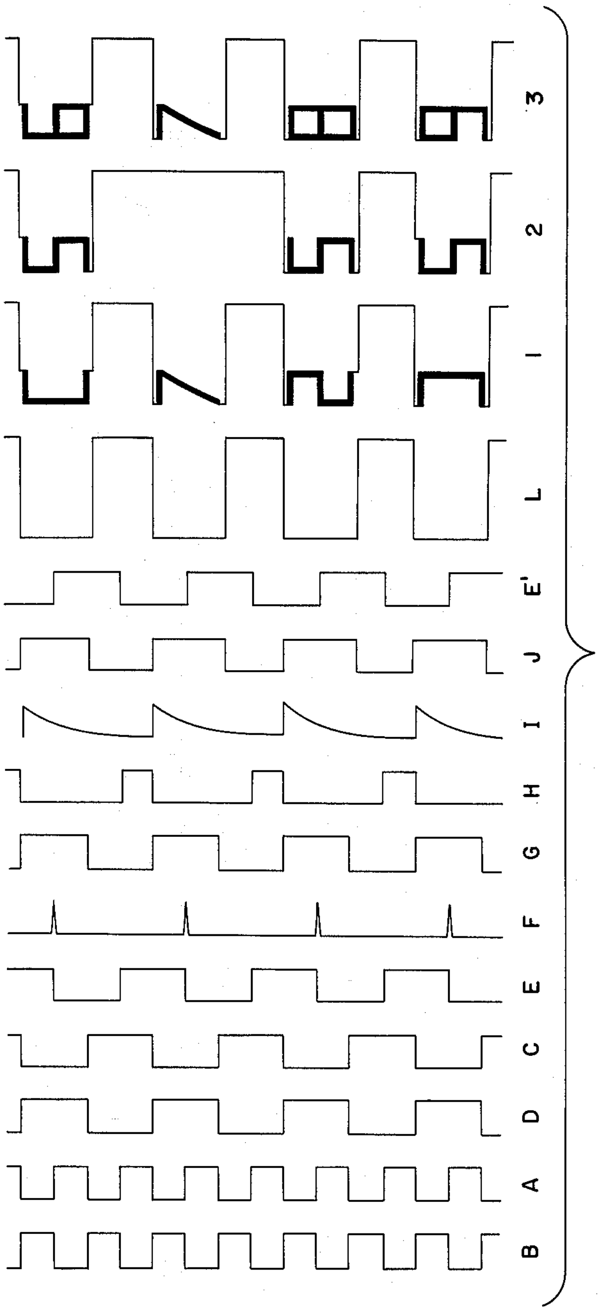
Figure 4:
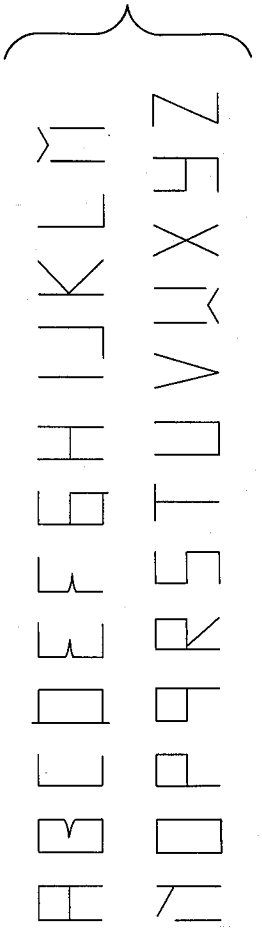
Figure 5A:
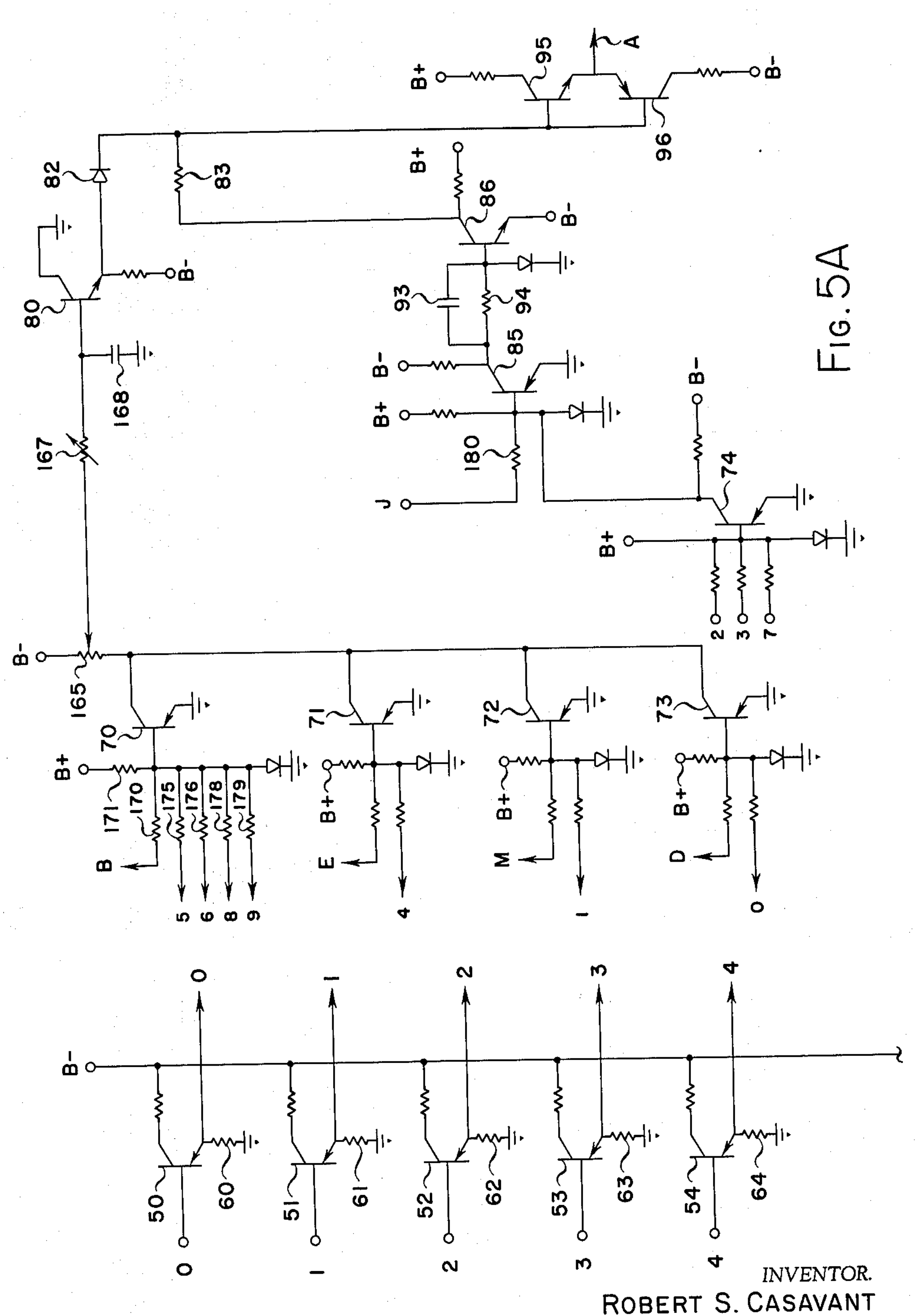
Figure 5B:
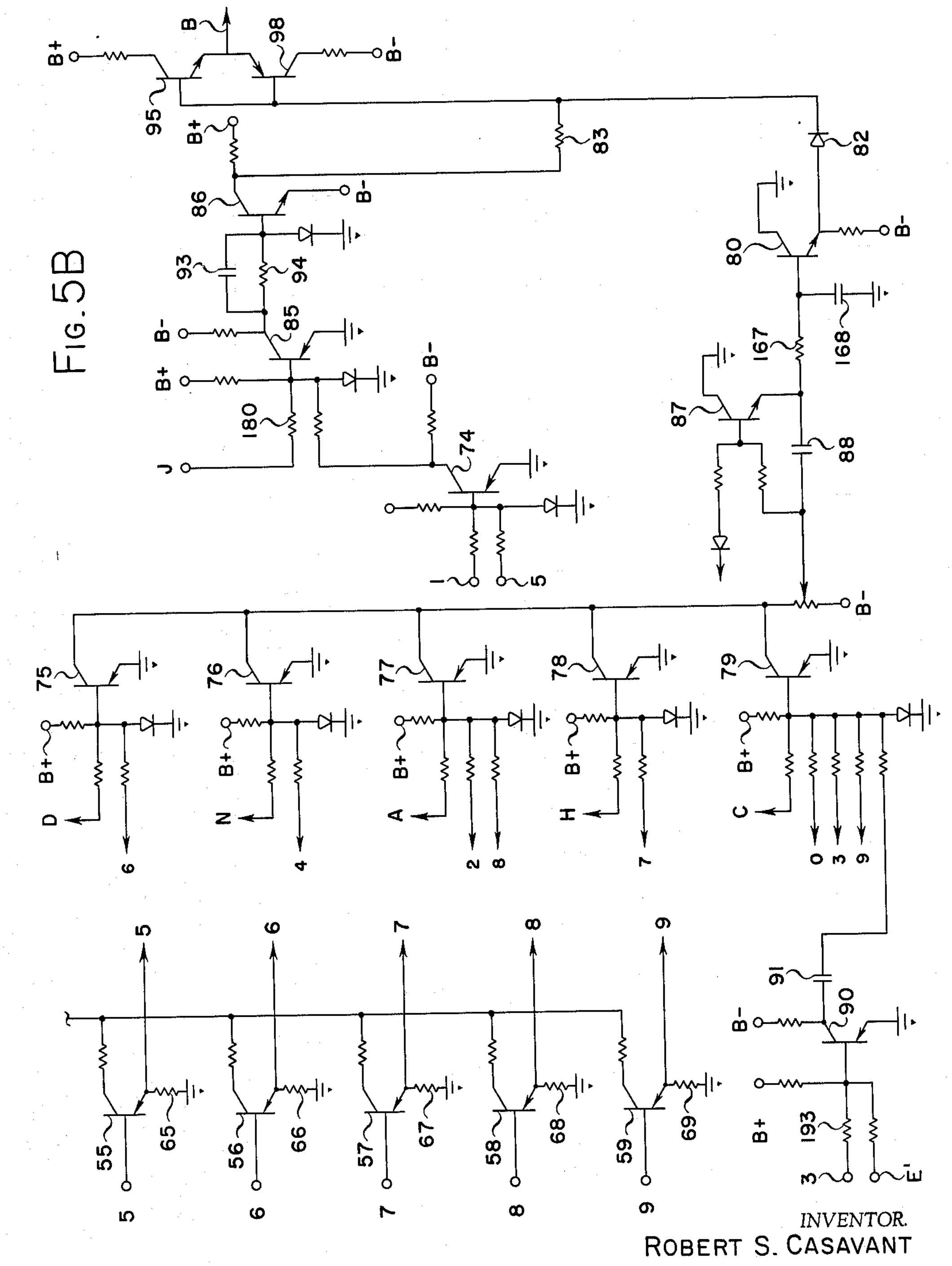
Figure 6:
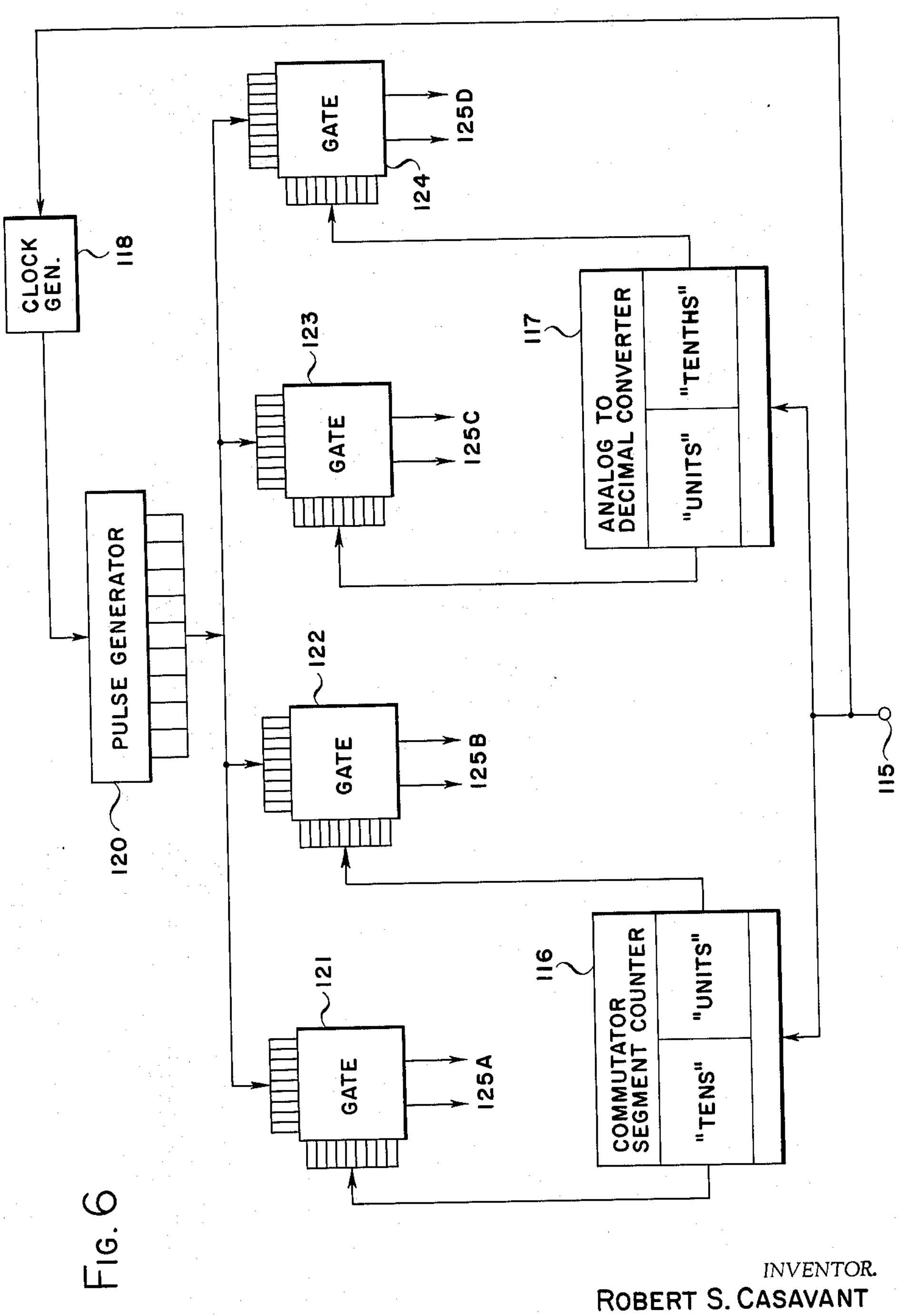
Figure 6A:
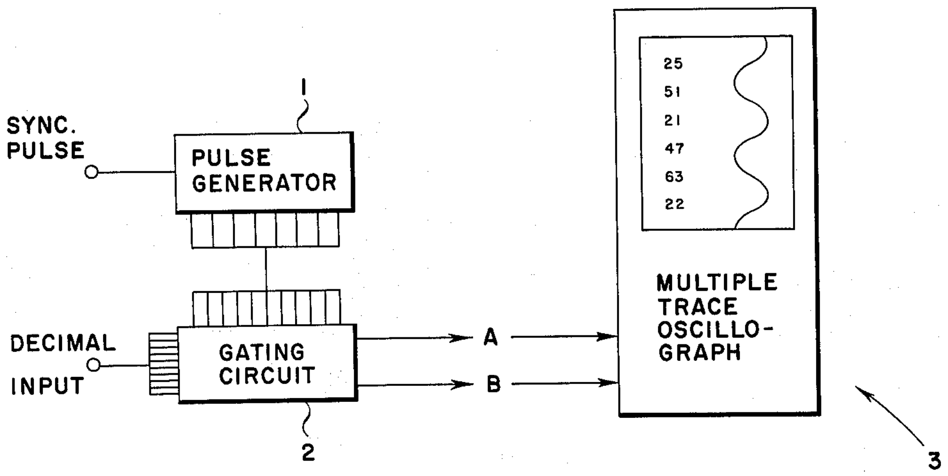
Figure 9:
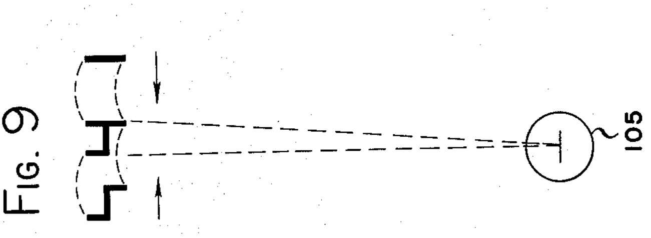
Figure 8:
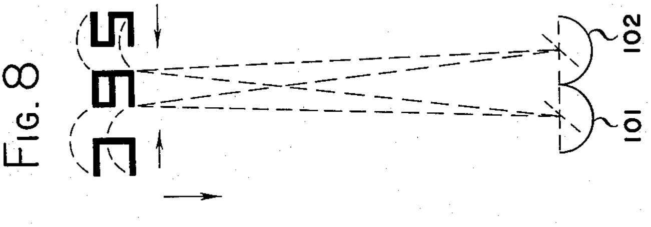
Figure 7:
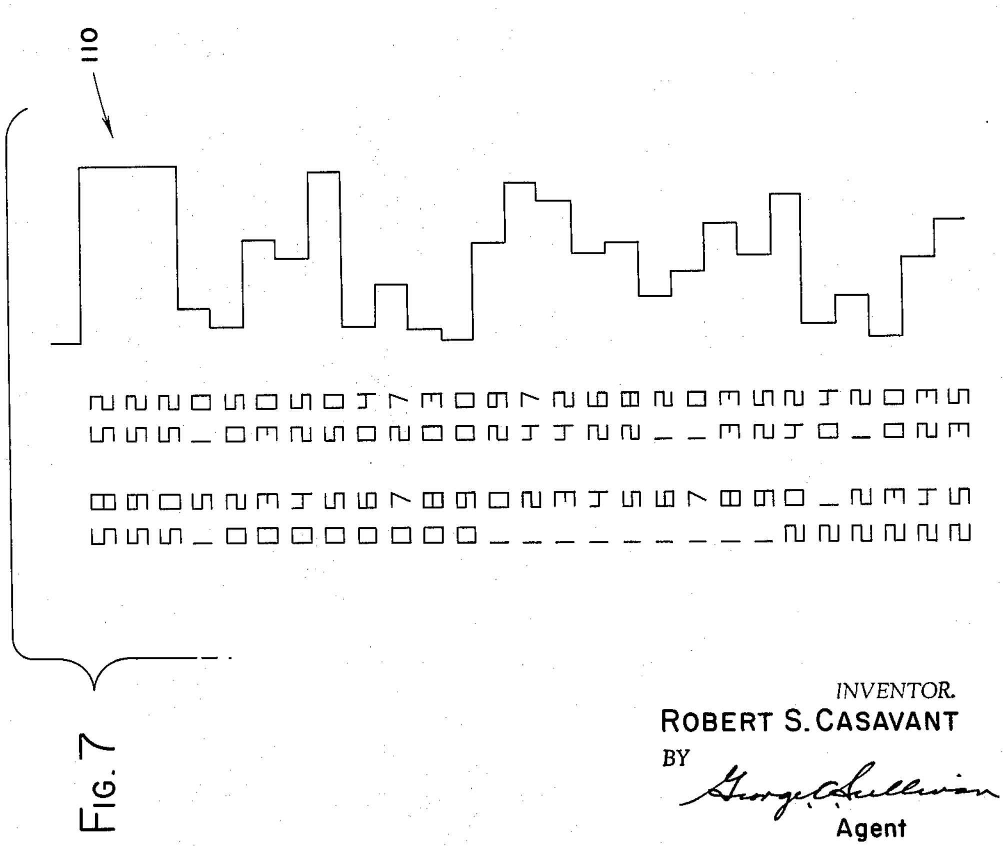

These and other features and objects of the present invention will become apparent upon a perusal of the following description and figures, of which:

FIGURE 1 is a block diagram of the pulse generator unit of the present invention, FIGURES 2A, 2B, 3A and 3B show output waveforms produced by the pulse generator and gate circuit, FIGURE 4 shows how alphabetical characters would be formed by using combinations of waveforms, FIGURES 5A and 5B are schematics of the gate circuit of the present invention, FIGURE 6 shows an exemplary system for utilizing the present invention, FIGURE 6A shows a basic block diagram of how this invention would be used, FIGURE 7 shows a typical output recording of the system depicted in FIGURE 6, FIGURE 8 shows how a pair of galvanometers typically produce a character, and FIGURE 9 shows an improved galvanometer configuration.

To aid in understanding the present invention, a short preface of the philosophy involved may be helpful. The pulse generator 1 of FIGURE 6A produces a plurality of synchronized waveform output signals, each of the signals being of a different predetermined waveshape. These waveshapes are shown as part of the waveshapes of FIGURES 2A, 2B, 3A, and 3B. These waveshapes are fed in parallel to a "gating" circuit 2, which gates one or more of the input waveshapes either in "nand" or "nor" fashion. The gating is in response to coded information from a character designation means, for example, an analog-to-decimal converter. The output from the "gating" circuit is either one, two, or more composite output signals, such as shown in columns 1 and 2 of FIGURES 2A, 2B, 3A and 3B. These output signals are fed from outputs A and B of the "gating" circuit to the input of a recording device, for example, a multi-trace oscillograph, or any other recording device having at least two visual traces capable of being deflected in a quadrature dimension and having a continuous time scale in one dimension. The output waveshapes from the "gating" circuit are applied to the oscillograph to deflect the galvanometers in response to the output signals. By overlapping the traces, as in FIGURE 8, the desired character is visually recorded. It is noted that to produce numbers 0, 4, 6, 8, and 9, two traces are required, and numbers 1, 2, 3, 5, and 7 require only one trace.

It is possible to produce these numbers on the face of a multi-beam oscilloscope by deflecting the electron beams in accordance with the output waveforms.

It is noted herein that the term "beam-responsive medium" is understood to include a surface upon which it is possible to produce a beam-responsive visible readout, for any length of time.

Referring now to the drawings, FIGURE 1 is a block diagram of the pulse generator which generates the basic waveforms for the present invention. A one-shot multivibrator 11 is triggered by an impulse or triggering signal from an internal clock or an external trigger (not shown). The impulse may or may not be periodic, can be of any reasonable width, and is not a part of the present invention. Complementary outputs of multi-vibrator 11 are connected to emitter-follower 13 and to flip-flop circuit 14. Complementary outputs from flip-flop 14 are fed to differentiator and mixer 15, to one-shot multivibrator 22, and to emitter-follower 29. Differentiator and mixer 15 differentiates and sums the positive going inputs and triggers a one-shot multi-vibrator 16 at twice the input pulse rate. The output from multi-vibrator 16 is squared by flip-flop 18 and a signal wave output from flip-flop 18 is fed to emitter-follower 30, and to flip-flop 19 which, along with the reset output from emitter-follower 13, generates a squared wave which is fed to emitter-followers 30 and 31. Flip-flop 20 is also reset by every trigger input from emitter-follower 13 and set by a selected output of flip-flop 19. The output from flip-flop 20 is fed to emitter-follower 31. From the foregoing, it may be seen that circuits 11 through 20 generate the basic number waveforms which are fed to emitter-followers 29, 30, and 31.

The basic offscale waveform is generated by one-shot multi-vibrators 21 and 22 and flip-flop 23. The purpose of the offscale voltage is to deffect the beam away from the column of characters being printed so that a better defined character may be viewed. One-shot multi-vibrator 21 is triggered by every output from emitter-follower 13 and the output from one-shot multi-vibrator 21 is fed to flip-flop 23. One-shot multi-vibrator 22 is coupled to flip-flop 23, which is also connected to the output of emitter-follower 13. Since multi-vibrator 21 is triggered by every trigger input, its pulse width may be adjusted internally to set flip-flop 23 and control the leading edge of the offscale waveform. One-shot multi-vibrator 22 may be adjusted internally to generate a pulse that resets flip-flop 23 and controls the trailing edge of the offscale waveform. The output of flip-flop 23 is in turn fed to emitter-follower 31.

A switch having contacts 26, 27, 28, 32, 33, and 34 is provided to give either a left or a right hand readout from the pulse generator. The purpose of this feature will be explained in the description of the gate circuit below.

Capacitors 12, 17, 24 and 25 are provided in multi-vibrators 11, 16, 21, and 22, respectively, to enable a varying pulse repetition rate to be generated by the pulse generator. It is noted that all the multi-vibrators, emitter-followers and flip-flops depicted as blocks are commercially available as modules from several sources, including Engineering Electronics Corporation. The differentiator-mixer of block 15 shown in schematic form in FIGURE 1A merely comprises a simple capacitor, resistor, diode arrangement as shown, and is considered to be within the knowledge of an electronics technician skilled in the art.

The waveform outputs which are produced by the pulse generator are depicted in FIGURES 2A and 2B, right readout, and in FIGURES 3A and 3B, left readout. The choice of left or right readout depends on the position of switch 35.

To illustrate the left hand readout, waveforms A and B of FIGURES 3A and 3B are complementary outputs produced by flip-flop 18 and fed out of the pulse generator via outputs A and B of emitter-follower 30. Waveforms C and D are complementary outputs produced by flip-flop 19 and are fed out of the pulse generator via output C of emitter-follower 30 and output D of emitter-follower 31 respectively. Waveforms E and E′ are the complementary outputs produced by flip-flop 14 and fed out of the pulse generator via outputs E and E′ of emitter-follower 29.

Waveform J produced by flip-flop 23 does not generate numbers, but is used to provide blanking only. Waveform H is produced by flip-flop 20 and is fed out of the pulse generator via output H of emitter-follower 31. Waveform F is produced in the gate circuit and will be explained in the description of that circuit, along with the waveforms I, L, and G, and the combined waveforms which are shown as the column of numbers.

It is pointed out that all of the waveforms fed from the pulse generator to the gate circuit are inverted therein, as will be explained below. An example may be seen in FIGURE 3B, where the lower segment of waveform B is inverted in the gate circuit to appear as the lower darkened segment of column 2, the lower segment of waveform C is inverted to appear as the lower darkened segment of column 1, and these segments are then combined to form the number 9, as seen in column 3.

As may be seen from FIGURE 3A, waveform A after inversion in the gate circuit is used to produce the number 2, and from FIGURE 3B we can see that waveform A plus waveform B is used to form the number 8. Waveform B after inversion in the gate circuit forms the number 5 and part of numbers 6, 8, and 9. Waveform D after inversion in the gate circuit forms a portion of the numbers 0 and 6, and waveform C after inversion in the gate circuit forms portions of number 0, 3, and 9. Waveform E after inversion in the gate circuit forms a portion of the number 4, and waveform F (derived from waveform E in the gate circuit) provides the notch in the number 3 in the gate circuit. Waveform H after inversion is differentiated in the gate circuit to look like waveform I to form the number 7.

When switch 35 is in the right hand position, certain of the waveforms are reversed as seen in FIGURES 2A and 2B. For example, output waveform D, which is positive-going when switch 35 is in the left hand position, is negative-going when switch 35 is in the right hand position. Output waveforms A, B, E, and J are not affected by switch 35 and are always the same.

FIGURES 5A and 5B are schematic diagrams of the gate circuit of the present invention. A plurality of emitter-followers 50 through 59 may or may not be provided as inputs from each decimal number, 0 through 9, depending on the impedance characteristics of the driving unit. The driver unit, or character-designating unit, could be, for example, an analog-to-decimal converter or a commutated segment counter, as seen in FIGURE 6 or any other character-designating unit as desired. The input code could be binary as well as decimal or any other desired code with a slight change in circuitry. For purposes of illustration, we will assume numeric inputs from an analog-to-decimal converter or a commutated segment counter is the driver source. With no input signal from the driving unit, all emitter-followers, 50 through 59, will be non-conductive and the voltage across output resistors 60 through 69 will be at 0 volts. Only one command or digital input, 0 through 9, is fed to the input of the gate circuit at any given instant. Therefore, only one emitter-follower 50 through 59 will be operating, and all other outputs will be at 0 volts potential.

The output from emitter-followers 50 through 59 is fed via the input resistors of gate transistors 70 through 79 in "OR" fashion. It is in these gate transistors that the waveforms from the synchronizer are inverted. For example, if the command input is the number 5, the command voltage, on the same order as B, will be developed across output resistor 65 of emitter-follower 55 and an input signal will be fed via input resistor 175 of gate transistor 70. Input resistors 176, 178, and 179 for numbers 6, 8, and 9 of gate 70 will remain at 0 volts since emitter-followers 56, 58, and 59 are non-conductive. The input of gate 70 through input resistor 170 is output B from emitter-follower 30 of the synchronizer of FIGURE 1. The bias on gate 70 is adjusted by adjusting bias resistor 171 so that two outputs will have to be at B− to turn the transistor full on. The command input from emitter-follower 55 is at a steady B− and the input from emitter-follower 30 of FIGURE 1 is a square wave of 0 to B− volts. The output from gate 70 is the complementary waveform of input and is coupled through resistor 165, which may be used to vary the width of the number being printed, and fed through an RC network comprising resistor 167 and capacitor 168. The RC network is a variable integrating network which permits some control over the slope of the square wave, and will be described in detail presently. Emitter-follower 80 couples the square wave signal to one leg of the "OR" gate comprising diode 82 and resistor 83. Resistor 83 of this "OR" gate receives the required offscale voltage. The offscale input voltage is applied to inverter transistor 86 by input resistor 180 from output J of emitter-follower 31 of the synchronizer via inverter transistor 85. The RC network comprising capacitor 93 and resistor 94 provides for the sharp edge of waveform J to be coupled via resistor 180 to inverter transistor 85. Capacitor 93 presents a low impedance to the leading edge to insure a sharp waveform being coupled to the inverter transistor 86. The purpose of the "OR" gate may be more easily seen by viewing FIGURES 3A and 3B, where it may be seen that some numbers require one output (A or B) from the gate circuit, while some numbers require two outputs (A and B) from the gate circuit. Gate transistors 70, 71, 72, and 73 are tied together as an "OR" gate to eventually form output A of the character generator; that is, through transistor 80 then through transistors 95 and 96 to output A of FIGURE 5A. The required offscale voltage is supplied to output A transistors 95 and 96 from transistors 74, 85 and 86. Upon the proper command, the offscale signal through resistor 83 prevents the output of transistor 80 from being coupled to the output transistors 95 and 96. Transistors 95 and 96 are arranged in complementary symmetry fashion to present the same driving impedance for both the positive and negative going portions of the waveforms.

Transistor 74 cuts off operation of transistor 85, thereby applying the output offscale voltage for commands 2, 3, and 7 on FIGURE 5A and for commands 1 and 5 on FIGURE 5B. From a study of the numbered diagrams of FIGURES 3A and 3B, it is seen that only one output waveform is needed to produce a number. Therefore it is necessary to keep the other output at its offscale voltage. Input commands 3 and 7 are unique in that they require a wave shaped somewhat differently from the other block numbers. For example, the number 7 is basically formed by the output H from pulse generator of FIGURE 1. This output is continually being fed to gate 78 of FIGURE 5B from emitter-follower 31. Upon the input of a command number 7, transistor 78 conducts and transistor 87 stops conducting, the signal being passed and differentiated by capacitor 88. The square wave output of transistor 78 is inverted and differentiated to form a more recognizable number 7. The amount of curvature would be determined by the value of capacitor 88. Therefore, the output across capacitor 88 would appear as waveform I of FIGURE 3A and 3B.

It is noted that like circuit elements in FIGURES 5A and 5B are identified with like reference numbers. For example, the portion of the gate comprising transistors 80, 82, 74, 85, and 86, and their associated components are identified with like references.

Upon receipt of command 3, the notching signal E' of FIGURES 3A and 3B is coupled via emitter-follower 29 of FIGURE 1 via output 3 through resistor 193 of FIGURE 5B to transistor 90. On command 3, the notching signal is inverted by transistor 90 and differentiated into a suitable spike by capacitor 91. The spike notches a hole in the center of the waveform being passed by gate 79. The size of the notch may be adjusted by varying capacitor 91 or by having a variable series resistor. The general circuitry for FIGURE 5B, which provides output B, is similar to that described in reference to FIGURE 5A. The outputs at A and B are used to drive oscillograph galvanometers, horizontal deflection plates of an oscilloscope, or other deflection devices of a beam deflection apparatus.

It is to be emphasized that the generation of the characters as just described includes only those characters making up the letters 0 through 9. Any other numbers, letters or similar characters could be easily produced by a person skilled in the art and following the above specification. For example, FIGURE 4 shows how the letters of the alphabet could be formed in the same manner. A slight variation in the pulse generator is necessary in order to form the desired wave shapes to form all the characters of the alphabet and an enlarged gate circuit would be necessary, but this would be considered within the skill of any person skilled in the art of electronic circuitry. It may be desirable to use more than two waveforms to produce the characters M, N, and W. However, this would be an economic consideration since more than two galvanometers would be needed.

In a typical application of the present invention, the output A and B waves from the gate circuit of FIGURES 5A and 5B would be coupled to a pair of galvanometers 101 and 102 of an oscillograph recorder such as depicted in FIGURE 8. The output from two galvanometers, each printing a separate waveform in a synchronous manner, would be combined to write any number or letter; for example, the number 9 as depicted. In this manner, the output waveforms B and C from emitter-follower 30 would be coupled through the gate circuit on command 9 and simultaneously present a display of the desired number. It is possible to house a pair of galvanometers in one housing, as seen in FIGURE 9, thereby reducing the cost of the device and increasing the number of galvanometers per oscillograph.

It is noted that it is possible to design the galvanometers with a window and housing just sufficient in width to permit generation of the number blanking out and requiring much smaller offscale voltages. This less stringent deflection requirement would then reduce the galvanometer mirror suspension requirements to permit mounting two mirrors in one housing.

One application of the present invention is shown in FIGURE 6 and FIGURE 7. A commutated input signal is fed to a galvanometer oscillograph for permanent recording thereon. A commutated waveform pattern 110 would normally be recorded on the recording paper. By using the present invention, the commutated signal would also be applied to input 115 of the apparatus shown in FIGURE 6. This input signal would be fed to a commutator segment counter 116 and an analog-to-decimal converter 117, both of which are readily available electronic components. The outputs from the commutator segment counter 116 and the analog-to-decimal converter 117 would be reduced to "tens," "units," and "tenths," and comprise the driving or character designating unit which commands the emitter-followers of each gate circuit 121–124. It is noted that only one pulse generator unit is necessary per family of numbers to be printed. In our example, we wish to print four columns of numbers as shown in FIGURE 7. The first two columns indicate the commutator segment number and the second two columns indicate the value of that segment number in volts, percentages, engineering units, or any other form desired. The clock generator 118 of FIGURE 6 would synchronize the pulse generator with the commutated wave train input. Outputs from the emitter-followers of the pulse generator 120 would be coupled in parallel to the four gate circuits 121–124. In this manner, the four top numbers of the four columns depicted in FIGURE 7 would be printed simultaneously upon command from pulse generator 120. The output signals from commutator segment counter 116 would produce and couple the number 5 from the "tens" output and the number 8 from the "units" output. The units output of the analog-to-decimal converter would produce and couple the number 5 in the "units" output and the number 2 from the "tenths" output of the gate circuits. The gate circuits would then have the commands applied to all gate circuits at one time, and numbers 58 and 52 would be printed simultaneously by four pairs of galvanometers.

It is noted that the only speed limitation for the present device would be the frequency response of the galvanometers being used, the paper speed and the paper emulsion characteristics. If the output were fed to the vertical deflection plates of a multi-trace oscilloscope for visual readout or photographing, extremely high frequency speeds would be possible. The only adjustment necessary in the oscilloscope would be to rotate the deflection plate voltages 90°, thereby applying the normal vertical sweep to the horizontal plates.

It is believed that any person skilled in the art of high-speed printing could find many further applications other than the exemplary ones described, for example, the present invention could be used in conjunction with a dual pen-strip chart recorder, wherein the pen would merely be substituted for the beam as heretofore described.

It is noted that the use of galvanometers, oscillographs, and oscilloscopes in describing and depicting operation of the present invention are exemplary and in no way limit the scope of the present invention. Further, it should be pointed out that considerable deviation could be effected in the circuit arrangements given without departing from the spirit of the invention as set forth in the following claims.

What is claimed is:

1. In an electronic apparatus for displaying alpha-numeric characters on a beam-responsive medium, the combination comprising a first means for generating a plurality of waveforms, a second means operably connected to said first means for receiving waveforms therefrom, character designating driver means operably connected to said second means, said second means including third means for passing waveforms from said first means upon signal from said driver and said second means further including an output, a beam-deflective apparatus operably connected to said output for receiving waveforms therefrom to form an alpha-numeric character corresponding to said character designating driver means.

2. The apparatus according to claim 1 wherein said third means for passing waveforms includes means for passing a plurality of waveforms simultaneously.

3. The apparatus according to claim 1 wherein said third means for passing waveforms includes means for passing one waveform.

4. The apparatus according to claim 1 wherein said beam-deflection apparatus includes a beam generating and projecting unit for generating beams and projecting said beams toward said beam-responsive medium, a beam deflection unit for deflecting each beam in a predetermined plane, said beam-responsive medium and the point of said beam having a relative motion which defines a straight line on said beam-responsive medium, said straight line being substantially normal to said plane, the output of said second means operably connected to said beam deflection unit.

5. In an electronic apparatus for displaying alpha-numeric characters upon a beam-responsive medium, the combination comprising a beam generating and projecting unit for generating beams and projecting said beams toward said beam-responsive medium, a beam deflection unit for deflecting each beam in a predetermined plane, said beam-responsive medium and the point of said beam having a relative motion which defines a straight line on said beam-responsive medium, said straight line being substantially normal to said plane, waveforming means operably connected to said beam deflection units, said waveforming means being energized by a character designating means, said beam deflection unit being controlled by a waveform from said waveforming means to produce on said beam-responsive medium a predetermined alpha-numeric character corresponding to said character designating means.

6. The apparatus according to claim 5 wherein said waveforming means includes a pulse generator and a gating circuit operably connected thereto, said pulse generator including means for producing a plurality of predetermined synchronized waveforms, said gating circuit receiving designated waveforms from said pulse generator upon command from said character designating means, said gating circuit including means for passing at least one of said waveforms to said beam deflection unit to produce designated alpha-numeric characters.

7. The apparatus according to claim 6 wherein said gating circuit further includes means for passing a plurality of selected waveforms from said pulse generator to said beam deflection means simultaneously to produce designated alpha-numeric characters.

8. The apparatus according to claim 7 wherein said gating circuit means and said pulse generator means are operably connected to said character designating means, said pulse generator including means for producing predetermined output waveforms synchronized with the designated characters of said character designation means.

9. The apparatus according to claim 8 wherein said gating circuit further includes means for producing alpha-numeric characters in synchronism with the designated characters from said character designating means.

10. The apparatus according to claim 9 wherein said beam-responsive medium includes a record-receiving medium.

11. The apparatus according to claim 10 wherein said beam-deflection unit for deflecting each beam in a predetermined plane includes a galvanometer and said beam-deflection apparatus includes an oscillograph recorder.

12. The apparatus according to claim 9 wherein said beam-responsive medium includes the face of an oscilloscope.

13. The apparatus according to claim 12 wherein said beam-deflection unit for deflecting each beam in a predetermined plane includes the deflection plate of a multi-trace oscilloscope and said beam-deflection apparatus includes a multi-trace oscilloscope.

14. An electronic waveform character generator comprising a first means for generating a plurality of waveforms, a second means operably connected to said first means for receiving waveforms therefrom, means for connecting an input character designating signal to said second means, said second means including third means for passing waveforms from said first means upon signal from said driver and said second means further including an output, means operably connected to said output for receiving waveforms therefrom to form an alpha-numeric character corresponding to said character designating driver means.

References Cited by the Examiner

UNITED STATES PATENTS

| | | | |
|---|---|---|---|
| 2,769,683 | 11/56 | Skelton | 346—109 |
| 2,775,503 | 12/56 | Peterson | 346—109 |
| 2,783,118 | 2/57 | Owen | 346—109 |
| 2,830,866 | 4/58 | Warner | 346—66 |
| 2,845,615 | 7/58 | Bowman | 340—324 |
| 2,875,017 | 2/59 | Reynolds | 346—109 |
| 2,937,915 | 5/60 | Peterson | 346—109 |
| 2,976,104 | 3/61 | Peterson | 346—33 |
| 3,066,300 | 11/62 | Widess | 346—109 |
| 3,107,137 | 10/63 | Bates et al. | 346—33 |

References Cited by the Applicant

UNITED STATES PATENTS

| | | |
|---|---|---|
| 2,766,444 | 10/56 | Sheftelman. |
| 2,781,508 | 2/57 | Suckling. |
| 2,920,312 | 1/60 | Gordon et al. |
| 2,989,702 | 6/61 | White. |
| 3,017,234 | 1/62 | Trimble et al. |
| 3,020,530 | 2/62 | Volberg. |
| 3,047,851 | 7/62 | Palmiter. |
| 3,060,419 | 10/62 | Shanahan. |

LEYLAND M. MARTIN, *Primary Examiner.*